United States Patent
Schwarz

(10) Patent No.: US 8,566,129 B1
(45) Date of Patent: Oct. 22, 2013

(54) METHODS FOR SUBROGATION AND REIMBURSEMENT OF RECOVERY AND PREMIUM REDUCTION OPTIMIZATION

(76) Inventor: Daniel A. Schwarz, Cherry Hill, NJ (US)

(*) Notice: Subject to any disclaimer, the term of this patent is extended or adjusted under 35 U.S.C. 154(b) by 0 days.

(21) Appl. No.: 13/346,317

(22) Filed: Jan. 9, 2012

(51) Int. Cl.
*G06Q 40/00* (2012.01)

(52) U.S. Cl.
USPC .............................................. 705/4

(58) Field of Classification Search
USPC .............................................. 705/4
See application file for complete search history.

(56) References Cited

U.S. PATENT DOCUMENTS

| | | | |
|---|---|---|---|
| 7,343,308 B1 | 3/2008 | Rojewski et al. | |
| 7,593,882 B2 | 9/2009 | Hamer et al. | |
| 2004/0111302 A1 | 6/2004 | Falk et al. | |
| 2005/0251429 A1* | 11/2005 | Ammer et al. | 705/4 |
| 2006/0116914 A1 | 6/2006 | Stemple | |
| 2007/0174094 A1 | 7/2007 | Ramsey | |
| 2007/0288272 A1 | 12/2007 | Marks et al. | |
| 2007/0288273 A1 | 12/2007 | Rojewski et al. | |
| 2008/0275725 A1* | 11/2008 | Hach et al. | 705/2 |
| 2009/0300065 A1 | 12/2009 | Birchall | |
| 2011/0022408 A1 | 1/2011 | Pramik et al. | |
| 2011/0047168 A1 | 2/2011 | Ellingsworth | |
| 2012/0330685 A1* | 12/2012 | Hasan et al. | 705/3 |

* cited by examiner

*Primary Examiner* — Jessica Lemieux
(74) *Attorney, Agent, or Firm* — Caesar, Rivise, Bernstein, Cohen & Pokotilow, Ltd.

(57) ABSTRACT

A method for subrogation recovery utilizing a computer system, including providing a database having of a plurality of records of health care claims, each record including a claim, personal data of a claimant of the claim, enrollment data of the claimant in one of a plurality of primary payers of the claim, a record of at least one of charges to the payer and payment by the primary payer to the claimant for each claim, and details of the claim. The method continues with identifying search criteria for searching the records that would likely lead to subset of potentially subrogable claims, searching the plurality of records based on the criteria, analyzing the subset of potentially subrogable claims to generate lists of potentially actionable claims for each of the plurality of primary payers, and providing at the lists of potentially actionable claims to each of the plurality of the primary payers.

1 Claim, 2 Drawing Sheets

METHODS FOR SUBROGATION AND REIMBURSEMENT OF RECOVERY AND PREMIUM REDUCTION OPTIMIZATION

BACKGROUND OF THE INVENTION

The present invention is directed to methods for subrogation and reimbursement recovery and to methods for optimizing premium reduction.

Subrogation is a method utilized by employers, health care insurers, health and welfare funds, government agencies and other entities (hereinafter collectively called "primary payers") to recover funds which they have previously paid out on behalf of insured individuals for medical treatment costs. Millions of health care claims are paid annually by such primary payers without a system or procedure to determine whether such payments are subrogable or reimbursable from third parties who may be legally responsible and liable for the payment of such costs. Legal precedent governed by laws such as ERISA and the Affordable Health Care for Americans Act, as well as contractual language contained in insurance premiums, collective bargaining agreements and other documents mandate that, where appropriate, the initial paying fund, i.e., the primary payer, is required to pursue any subrogation rights in order to recover such health care costs and claims, thereby reducing cash outlays of the fund and, in turn, reducing insurance costs to insured persons.

In the past, primary payers have paid health care providers for medical treatment without knowing or determining the origin or identity of the potential causes requiring the underlying medical treatment. If there is no way to analyze, track or trace data pertaining to the epidemiological and medical causes of the medical treatment, it follows that there is also no way to assess responsibility for the corresponding costs. To date, access to this data was restricted and labor and industry had no means to monitor, organize and analyze it. Inaccurate and imprecise reporting and recording practices have made this data and information unreliable for any present or future use. Thus, in order to analyze, compare and understand medical causation and medical treatment trends as well as to determine the responsibility for payment of the corresponding medical treatment costs, it would be beneficial to have defined and objective systems and procedures implemented to organize and analyze health care claim information.

Traditionally, health and welfare plans pursue subrogation in auto accident, premises liability, products liability and medical malpractice claims. Oftentimes, health and welfare plans take a "wait and see" approach to see if a plan participant pursues a third-party claim. Presently, funds have no in-house system to monitor reimbursement of these claims based on activities of outside attorneys. Fund plans employing this methodology suffer from inconsistent results because the plan is at the mercy of the attorney who was chosen by the plaintiff/insured to litigate the case. Likewise, funds have no in-house system to identify through diagnosis information those claims most likely to be subrogable to a third party. As a result, the plan has little ability, if any, to monitor and pursue its maximum recovery potential.

BRIEF SUMMARY OF THE INVENTION

The method of the present invention is designed to maximize subrogation recoveries so that primary payers, such as health and welfare benefits plans can reduce health care costs, contribution rates and utilization. Using computer based technology, data files of paid claims are analyzed to identify and quickly pursue potentially recoverable third party subrogable claims. The system may analyze hundreds of thousands of previously paid medical and drug claims through using computer technology and software. Once potentially subrogable claims are identified, subrogation specialists investigate the claims and may pursue various avenues of subrogation.

The present unique invention is a subrogation recovery and premium reduction optimization ("SRPRO") system by which certain medical costs paid out by primary payers can be recovered as a result of analyzing and identifying those charges to the payer or payments to the claimant which were for illnesses and injuries caused by third parties who are legally responsible for the payments of such claims. Subrogation is the method which is utilized to recover such payments.

The SRPRO system employs unique procedures and methods to ferret out those subrogable medical payments. There are also collateral benefits to the SRPRO system. First, workers and/or other individuals who may not be aware of the possibilities of contracting certain diseases as a result of certain chemical exposures or injuries resulting from faulty medical devices or medications may be identified and made cognizant of such conditions in accordance with federal Health Insurance Portability and Accountability Act of 1996 (HIPAA) regulations. Early recognition of such potential health risks is an asset in the treatment and care associated with such conditions. Second, the SRPRO system is able to aggregate data paid out by several primary payers to identify potential trends relating to payment of medical treatment costs to report spikes in claims data and potential subrogable or reimbursable third party claims previously unknown to such primary payers which have paid medical treatment costs. A third benefit arising from the successful use of the SRPRO system occurs when the primary payer responsible for the initial payments is reimbursed so that additional dollars are available for non-subrogation health costs. A fourth benefit from the SRPRO system involves insurance premium reductions from subrogated claim recoveries above and beyond the net subrogation claims typically factored into health care trend assumptions when setting renewal rates for health insurance premiums, thereby reducing health insurance costs for the average insured. Other benefits involve worker health and safety awareness, higher production rates, etc.

In short, the utilization of the SRPRO System is a major improvement in the economic as well as the personal health status of all those included within the system's coverage.

In a first exemplary, preferred embodiment of the present invention, a method for subrogation recovery utilizing a computer system is provided where the computer system includes a database and a processor. The database has a large number of records of previously paid health care claims. Each record may include a claim, personal data of a claimant of the claim, enrollment data of the claimant in one of a plurality of primary payers of the claim, a record of charges to the payer or payment by the primary payer to the claimant for each claim, and details of the claim. The method may include an anonymization step, either for compliance with legal requirements such as HIPAA, etc. or solely based on the desire of the user, to use the processor to remove Personal Health Information ("PHI") based on specified anonymization criteria, thereby rendering the claims data anonymous, while retaining their diagnostic and financial information.

The method continues with the step of identifying search criteria for searching the records that would likely lead to subset of potentially subrogable claims based on the search criteria. By way of example, but without limitation, this may include the identification of known ICD-9 diagnostic codes representing likely subrogable injuries or diseases. Using the processor, the records are searched based on the criteria to yield the subset of potentially subrogable claims. Using the processor, the subset of potentially subrogable claims is analyzed to generate lists of potentially actionable claims for each of the plurality of primary payers. Finally, the lists of potentially actionable claims are provided to the primary payers having one or more potentially subrogable claims.

The details of the claim may include, for example, pharmacy transaction data, medical diagnostic data, medical billing data, prescription drug claims, details where particular medical devices were used, and records related to claims stemming from cancers associated with exposure to toxic chemicals. The pharmacy transaction data may meet National Council for Prescription Drug Programs standards. The medical billing data may be in the form of ICD-9 or similar codes.

The primary payers may be, for example, employers, insurers, health funds, welfare funds, and government agencies.

The method may further include the step of aggregating primary payers into groups where each group has common potentially actionable claims. Here, the step of analyzing the subset of potentially subrogable claims may include generating lists of the common potentially actionable claims for each of the plurality of primary payers in each group.

In a second preferred, exemplary embodiment, a method for reimbursement to an insurance company utilizing a computer system is provided where the computer system includes a database and a processor. First, the database is provided which includes a large number of records of previously paid health care claims where each record includes a claim, personal data of a claimant of the claim, enrollment data of the claimant in one of a plurality of primary payers of the claim, a record of charges to the payer or payment by the primary payer to the claimant for each claim, and details of the claim. The method continues with the steps of searching the records to obtain evidence that a particular claimant has retained a particular attorney and identifying that attorney. Finally, the method includes contacting each particular attorney identified to demand that the company be reimbursed or the insurance company may no longer be required to make payments for breach of provisions of the insurance policy.

BRIEF DESCRIPTION OF SEVERAL VIEWS OF THE DRAWINGS

The invention will be described in conjunction with the following drawings, wherein.

DETAILED DESCRIPTION OF THE INVENTION

The invention will be illustrated in more detail with reference to the following embodiments, but it should be understood that the present invention is not deemed to be limited thereto.

Figure 1:
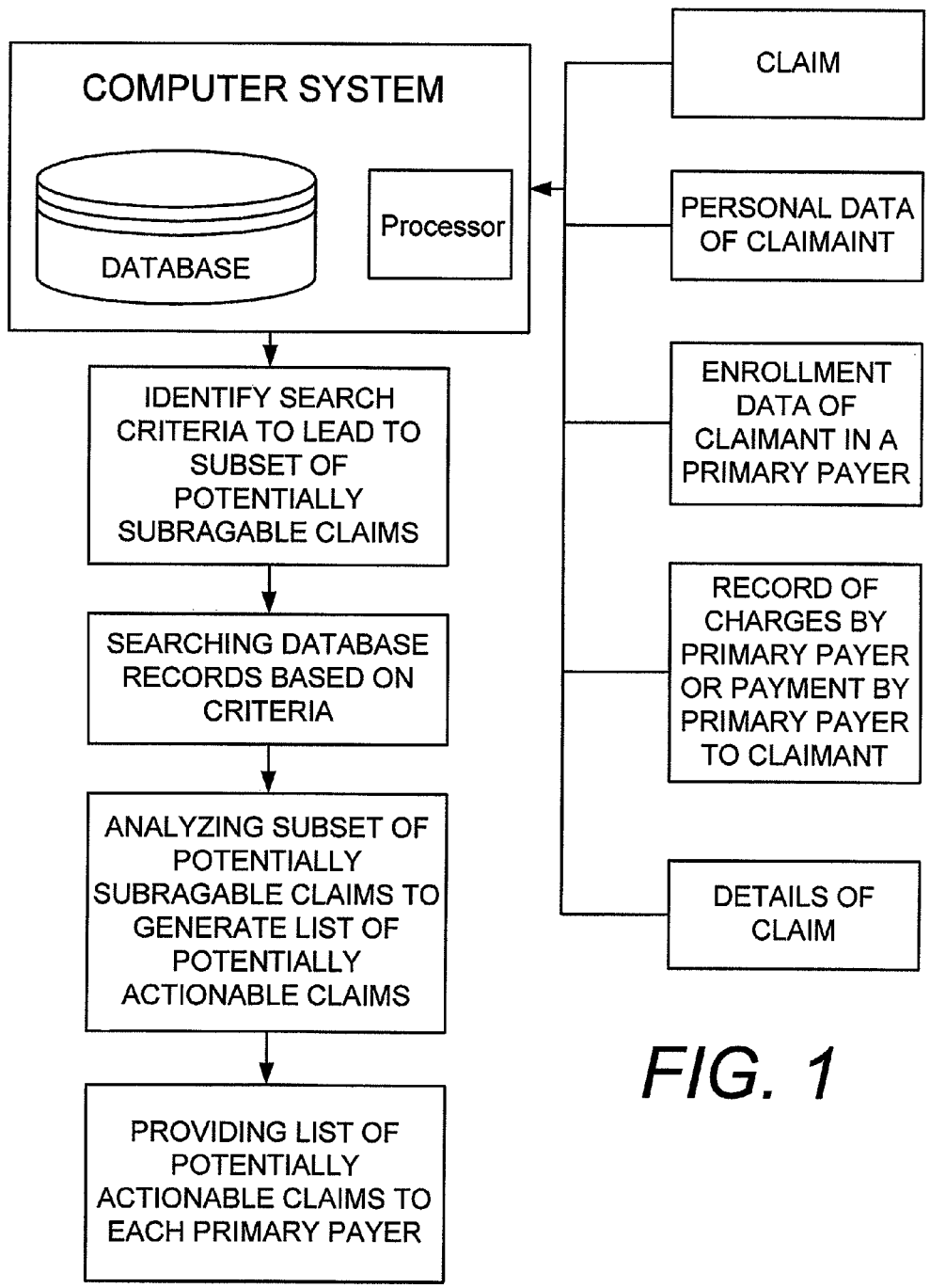
FIG. 1 is a flowchart of a method for subrogation in accordance with a preferred, exemplary embodiment of the present invention.

Referring now to the drawing figures, there is shown in FIG. 1 a method for subrogation recovery utilizing a computer system in accordance with a preferred, exemplary embodiment of the present invention. The computer system includes a database and a processor. The database has a large number of records of previously paid health care claims. Each record includes a claim (i.e., a formal request to the primary payer asking for payment based on, for example, the terms of an insurance policy, etc.), personal data of a claimant of the claim (i.e., identification such as name, address, social security number, etc. of the person filing the claim), enrollment data of the claimant in one of a plurality of primary payers of the claim (i.e., information regarding the holder of the insurance policy, etc. associated with the claim; the primary payer may be, for example, employers, insurers, health funds, welfare funds, government agencies, and the like), a record of charges to the payer or payment by the primary payer to the claimant for each claim, and details of the claim. Details of the claim may include, but are not limited to, diagnoses, prescription drugs prescribed, medical test records, treatments, surgeries, hospitalizations, International Statistical Classification of Diseases and Related Health Problems (ICD9) diagnostic codes, National Council for Prescription Drug Programs (NCPDP) pharmacy transaction data, medical apparatus and devices used, exposure to toxic chemicals and substances, rehabilitation services, and the like.

The method continues with the step of identifying search criteria for searching the records that would likely lead to subset of potentially subrogable claims. Using the processor, the records are searched using the search criteria that was identified. The subset of potentially subrogable claims is then analyzed by the processor to generate lists of potentially actionable claims for each of the primary payers. Finally, lists of potentially actionable claims are provided to each of the plurality of the primary payers for further action.

During the step of analyzing the subsets of potentially subrogable claims, a step of aggregating the primary payers into groups where each group has common potentially actionable claims may be performed to assist in identifying subrogable claims. Here, common potentially actionable claims may be identified.

Figure 2:
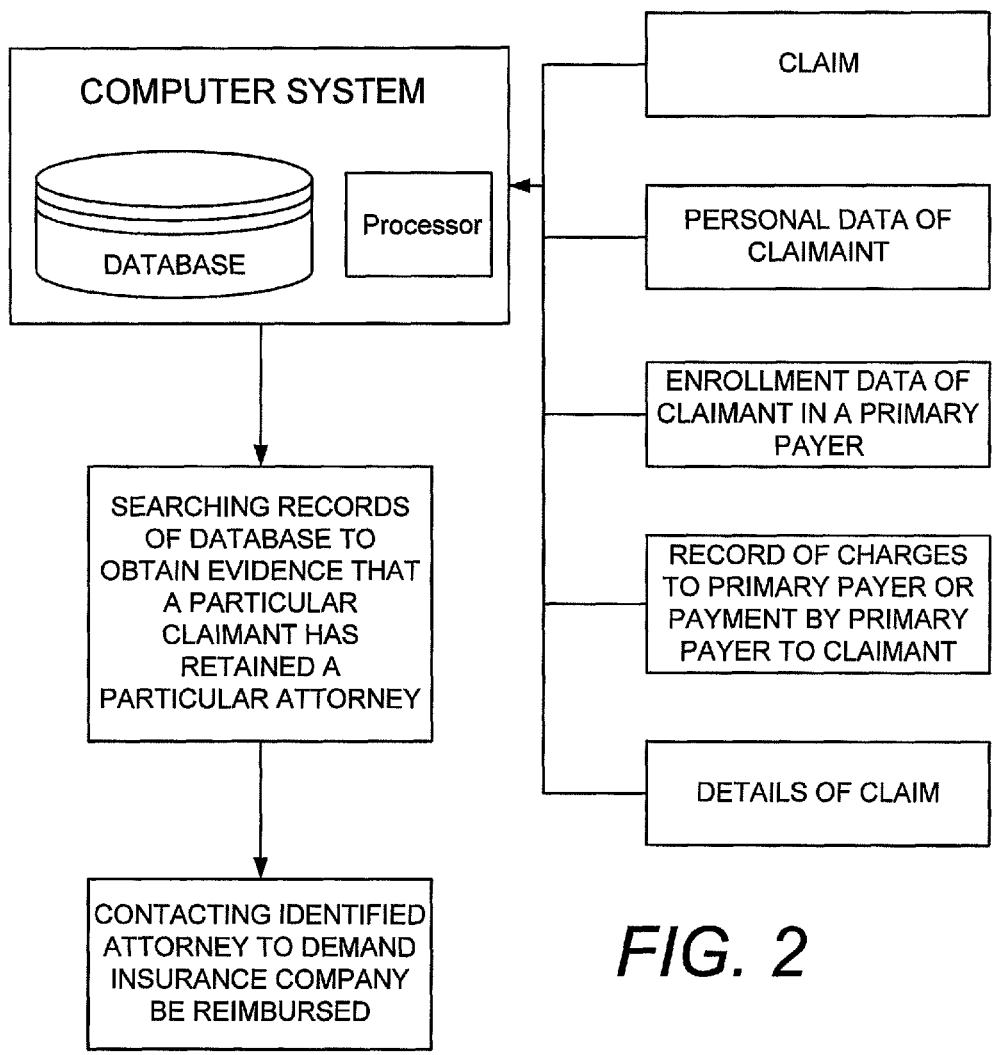
FIG. 2 is a flowchart of a method for reimbursement to an insurance company in accordance with another preferred, exemplary embodiment of the present invention.

Referring now to FIG. 2, a method for reimbursement to an insurance company utilizing a computer system is provided where the computer system includes a database and a processor, in accordance with another preferred exemplary embodiment of the present invention. As in the method of FIG. 1, The database has a large number of records of previously paid health care claims. Each record includes a claim, personal data of a claimant of the claim, enrollment data of the claimant in one of a plurality of primary payers of the claim, a record of charges to the payer or payment by the primary payer to the claimant for each claim, and details of the claim. As above, details of the claim may include, but are not limited to, diagnoses, prescription drugs prescribed, medical test records, treatments, surgeries, hospitalizations, International Statistical Classification of Diseases and Related Health Problems (ICD9) diagnostic codes, National Council for Prescription Drug Programs (NCPDP) pharmacy transaction data, medical apparatus and devices used, exposure to toxic chemicals and substances, and the like.

The method for reimbursement as shown in FIG. 2 further includes the step of searching the records to obtain evidence that a particular claimant has retained a particular attorney and identifying the particular attorney. Finally, the method continues with the step of contacting each particular attorney identified to demand that the company be reimbursed or the insurance company may no longer be required to make payments for breach of provisions of the insurance policy.

Examples of the Use of the Subrogation Recovery System:

There are numerous situations where the utilization of the subrogation recovery system of the present invention can result in savings of millions of dollars to the primary payers which initially pay out health care costs and the like. For example, tens of thousands of construction workers have been exposed to asbestos, resulting in cancers, such as mesothelioma. Because, until now, there was presently no comprehensive system to analyze, compare and understand the epidemiological and medical causes for such conditions, it has been impossible for primary payers to adequately determine and identify third party responsibility.

Another example where an epidemiological and medically identified causal relationship exists occurs when a person is exposed to benzene and contracts a rare blood disorder known as acute myeloid leukemia. In most cases, the same approximate health care costs that are incurred to treat asbestos cancer types would also be required to treat individuals who are exposed to benzene and who develop certain types of lymphatic cancers. Those costs usually amount to hundreds of thousands and sometimes millions of dollars.

Since the treatment costs for these types of cancers are obviously great, the ability to systematically identify third party responsibility would result in enormous health care savings for primary payers. Individuals who are diagnosed with these types of cancers receive various forms of oncology treatment, including multiple rounds of chemotherapy, surgical intervention, psychiatric counseling, inpatient hospitalization related to procedures and/or infections, possible lung or bone marrow transplants, stem cell transplants and terminal care. The health care costs often amount to hundreds of thousands, and even millions of dollars for just a single individual's medically necessary cancer treatment care program. The present subrogation recovery system invention provides its users the ability to analyze, track and recover some of these enormous health care costs.

In addition to toxic chemical exposures, another example utilizing the subrogation recovery system of the present invention involves defective medical devices, such as poorly or defectively designed hip and knee replacements. These types of poorly or defectively designed products often necessitate surgical revisions which result in significant medical costs associated with, for example, revision surgery, hospitalization, anesthesia, multiple diagnostic studies, extensive therapy and rehabilitative care, pain medication, and physician care. These costs often exceed hundreds of thousands of dollars for each individual's treatment care.

Another example where the impact of a primary payer's catastrophic medical treatment costs can be alleviated occurs when the subrogation recovery system is utilized to analyze and identify improperly manufactured and/or tested pharmaceutical products, such as Avandia, which is known to have caused various types of cardiac abnormalities. The ancillary medical care associated with these poorly and defectively manufactured and tested pharmaceutical products has resulted in millions of dollars of additional medical treatment costs beyond the cost of the medication and treatment initially prescribed.

Impact of Health Care Costs:

When health care costs of an employer increase, the burden also falls directly upon the employee in the form of lower wages and reduced benefits. The above examples of various types of exposures, products and pharmaceuticals are just limited instances of how health care resources are improperly utilized without any type of system or program to seek reimbursement from the responsible parties.

Impact on Health Insurance Premiums:

Increases in health insurance premiums are a product of overall increases in health care utilization, coupled with rising health insurance costs. Insurers that maintain high administrative expense costs charge higher premiums compared to health insurers who can attribute a larger portion of premiums toward the payment of benefits. The calculation of the renewal premiums for an experience-rated fund in its simplest terms is outlined below:
  Net Costs equal
  Gross Claims
  Less Discounts
  Less Co-Insurance and Deductibles
  Less Coordination of Benefits
  Less Net Subrogated Claims
  Plus Retention For health and welfare funds that are experience-rated and fully credible, the cost of benefits is based on the net amount of claims and the expenses the fund incurs. The lower the amount of claims a fund is required to pay, the lower the renewal premiums. A benefit of the present system is that funds are able to track claims to show that a particular incident resulted in a subrogation recovery. By pursuing subrogation, a fund will be able to reconcile its ledger by taking a chargeable episode off the books when looking at utilization for future premiums. A fund may be able to adjust its claims experience downward because there is potential to receive reimbursements from previously unidentified subrogated claims above and beyond the common subrogation which is traditionally factored when setting renewal rates for health insurance premiums.

Solution to Lessening Impact of Catastrophic Health Care Costs:

Efforts have been made to reduce health care inflation through cost containment vehicles such as preferred provider arrangements and preventative care and wellness programs. However, none of the present cost care containment vehicles provides a mechanism and program to analyze, study and track epidemiological and medical data in order to identify those entities who should be the responsible parties to pay the increasing health care costs. The present invention provides a mechanism and vehicle for analyzing and tracking health care claim data and costs for the purpose of identifying subrogable or reimbursable third party claims for employers, insurers, governmental agencies and other entities.

Details Concerning the Operation of the Subrogation Recovery System:

To provide the framework for analysis of the health care claim data, the present invention will utilize a subrogation software program which will analyze data, for example, 837 electronic claims, 835 records of charges or payments, 834 benefit enrollment data and National Council for Prescription Drug Programs (NCPDP) pharmacy transaction data. Prior to the present invention, the enormity of being capable of analyzing and tracking millions of medical claims for the purpose of identifying subrogable third party claims was either too complex, too large or too fragmented in scope. Under the present system, using a software program designed for use in accordance with the present invention, the primary payers will be able to suggest and search criteria on which to identify a subset of claims which are potentially subrogable. Additionally, the present system is able to aggregate data paid out by several industry and labor funds to identify potential trends relating to payment of medical treatment costs to report spikes in claims data and potential subrogable or reimbursable third party claims previously unknown to such primary payers which have paid medical treatment costs. The subrogation medical health claim software program further performs the necessary analysis and tracking by applying the universally accepted coding principles of the International Statistical Classification of Diseases and Related Health Problems (ICD9) diagnostic codes.

The ICD9 diagnostic codes are based on the HIPAA compliant billing system upon which all medical claims are submitted by health care providers. The billing system operates as follows:

The health care provider includes on its bill, a medical treatment or ICD9 diagnostic code type, which correlates to a numerical field. This medical treatment or ICD9 diagnostic code further correlates to a billing amount in order for the medical provider to seek reimbursement from the employer, insurer, health and welfare fund, government agency or other entity. The subrogation recovery system is not only capable of analyzing, comparing and tracking medical health care data such as the 837 electronic claims data, 835 record of charges or payments, 834 benefit enrollment data and NCPDP pharmacy transaction data but can also correlate the same with the ICD9 diagnostic coding and billing data. The present invention enables its users to identify the relevant subrogation information once the aforementioned data is correlated by the subrogation recovery system's software program. Primary payers will be able to suggest and search criteria on which to identify a subset of claims which are also potentially subrogable.

By incorporating the above health care claim data into the system's comprehensive subrogation software program, the system will be able to analyze and identify relevant third party claim types allowing a fund to recapture and reclaim its costs.

Without the kind of program which the system provides, it is clear that funds making such astronomical payments are without the benefit of the ability to adequately recover such payments to which they are entitled. Thus, following the search analysis through the use of the system's program, an employer, insurer, health and welfare fund, government agency and/or other entity is now in a position to determine whether subrogation will be pursued to seek reimbursement for the paid medical treatment costs which are the responsibility of a third party.

When potentially actionable subrogation claims are identified, the system generates a list of potential actionable claims and forwards this information to the appropriate contact person of the primary payer which made the initial payments. The user can also follow a hyperlink to view a report containing detailed information on the claims and can then pass the information along to the primary payers, accessed via a secure website.

Following the identification of a third party subrogation claim, and notice of same to the primary payer, an investigative procedure of the health care claims in question will be instituted at which time the individual who was furnished the corresponding medical care will be contacted to provide additional information regarding that individual's respective treatment.

The use of the system further enables its user to calculate the total loss of each individual claim by correlating all relevant medical treatment and charge or payment records associated with treating the affected individual.

Method of Recovering Subrogable Claims

After receiving all of the relevant information from the system's program, the primary payer must determine how and if they intend to pursue a direct claim seeking reimbursement or pursue an indirect claim against the responsible third party. This may be determined by the individual who was adversely impacted by the exposure, product or pharmaceutical and whether that individual elects to pursue a direct claim for recovery against the responsible third party while simultaneously protecting the interest of the entity which initially paid the health care costs.

By utilizing the present system, in conjunction with an interview of and questionnaire directed to the involved individual, the primary payers now have the ability to reconcile their data and choose the method of subrogation best suited to the circumstances.

As described above, the present system represents a unique program which enables millions of dollars of health care payments to be reimbursed to the primary payer initially paying for same by analyzing and identifying third parties who were and are legally responsible for such payments. The recovery of such funds obviously provides immense benefits to its users. To date, there is no other known comparable program or system which results in such enormous benefits to the economic welfare of its users as well as to the health and safety of the individuals who were wrongly affected by the third parties who legally caused their diseases and/or injuries.

Until now, subrogation has typically been performed in the context of an accident or event that creates a likelihood of subrogation. The present invention, instead of analyzing events where such accidents or events took place, all claims in a database may be analyzed in an effort to uncover subrogable claims All references cited herein are incorporated herein by reference in their entireties.

While the invention has been described in detail and with reference to specific examples and embodiments thereof, it will be apparent to one skilled in the art that various changes and modifications can be made therein without departing from the spirit and scope thereof.

What is claimed is:

1. A method for subrogation recovery utilizing a computer system, the computer system comprising a database and a processor, the method comprising:
   (a) providing the database having of a plurality of records of previously paid health care claims, each record comprising:
       (i) a claim;
       (ii) personal data of a claimant of the claim;
       (iii) enrollment data of the claimant in one of a plurality of primary payers of the claim;
       (iv) a record of at least one of charges to the payer and payment by the primary payer to the claimant for each claim; and
       (v) details of the claim;
   (b) identifying search criteria for searching the plurality of records that would likely lead to subset of potentially subrogable claims based on the search criteria;
   (c) searching, using the processor, the plurality of records based on the criteria;
   (d) analyzing, using the processor, the subset of potentially subrogable claims to generate lists of potentially actionable claims for each of the plurality of primary payers;
   (e) providing the lists of potentially actionable claims to each of the plurality of the primary payers; and
   (f) aggregating primary payers into groups where each group has common potentially actionable claims and wherein analyzing the subset of potentially subrogable claims includes generating lists of the common potentially actionable claims for each of the plurality of primary payers in each group.

* * * * *